United States Patent [19]

Abe et al.

[11] 4,450,823

[45] May 29, 1984

[54] FUEL EVAPORATOR FOR INTERNAL COMBUSTION ENGINE

[75] Inventors: Seiko Abe, Okazaki; Toshihiko Igashira; Kazuhide Watanabe, both of Toyokawa, all of Japan

[73] Assignee: Nippon Soken, Inc., Nishio, Japan

[21] Appl. No.: 491,644

[22] Filed: May 4, 1983

[30] Foreign Application Priority Data

May 4, 1982 [JP] Japan .................................. 57-65449

[51] Int. Cl.³ ............................................ F02M 31/00
[52] U.S. Cl. .................................... 123/549; 123/552; 261/142; 219/207
[58] Field of Search ............... 123/549, 552, 545, 546; 261/142; 219/205, 301, 528, 206, 307, 548, 207, 306, 549

[56] References Cited

U.S. PATENT DOCUMENTS

| | | | |
|---|---|---|---|
| 4,108,125 | 8/1978 | Marcoux | 123/549 |
| 4,141,327 | 2/1979 | Marcoux et al. | 123/549 |
| 4,279,234 | 7/1981 | Marcoux | 123/549 |
| 4,384,563 | 5/1983 | Siefer | 123/549 |
| 4,387,676 | 6/1983 | Couceiro | 123/549 |
| 4,387,690 | 6/1983 | Chiavaroli | 123/549 |
| 4,407,254 | 10/1983 | Kato | 123/549 |

*Primary Examiner*—Ronald H. Lazarus
*Attorney, Agent, or Firm*—Cushman, Darby & Cushman

[57] ABSTRACT

A fuel evaporator for an internal combustion engine, which is provided with a ceramic heater, is disclosed. The fuel evaporator comprises a plurality of layered thin PTC ceramic plates, each of which has a plurality of open holes, electrodes which are provided on an upper surface, an under surface and between adjacent ceramic plates, and an insulator for securing the outer periphery of the layered PTC ceramic plates to the wall defining an air-fuel passage of an engine. The ceramic plates are electrically connected to one another in parallel so that each ceramic plate is rapidly heated by consuming only a small amount of electric power.

7 Claims, 7 Drawing Figures

FUEL EVAPORATOR FOR INTERNAL COMBUSTION ENGINE

BACKGROUND OF THE INVENTION

The present invention relates to a fuel evaporator for an internal combustion engine, which is provided with a ceramic heater.

The conventional ceramic heater of this type has been made of a ceramic of positive temperature coefficient of resistivity (PTC ceramic) which is formed into a honeycomb structure provided with a large number of open passages for flowing air-fuel mixture therethrough.

PTC ceramic has a small resistivity at a normal temperature. When electric current is supplied to the PTC ceramic, the temperature thereof rises to about 150° C. When the temperature of the PTC ceramic exceeds 150° C., the resistivity thereof rapidly increases so that the temperature of the PTC ceramic is maintained at about 150° C.

Electrode surfaces for supplying electric current into the ceramic heater are usually formed on both of the upstream end surface and the downstream end surface of the ceramic heater or on side surfaces thereof which are opposed to each other.

When the electrode surfaces are formed on both end surfaces of the ceramic heater, the thickness of the heater must be made small as far as possible for raising the temperature of the ceramic heater up to about 150° C. in a moment. However, the thickness of the ceramic heater cannot be made smaller than about 10 mm in order to maintain the strength of the fragile ceramic heater. Therefore, in this case, the rapid temperature rise cannot be obtained.

When the electrode surfaces are formed on the side surfaces of the ceramic heater, such a problem as follows, occurs. Namely, since the ceramic heater is disposed so as to cross the air-fuel passage, in general, the ceramic heater must have a diameter larger than that of the air-fuel passage. Therefore, when the electrode surfaces are formed on the side surface of the ceramic heater so as to be opposed to each other, the distance between the opposed electrode surfaces becomes larger than that between the upstream end surface and the downstream end surface so that resistivity of the ceramic heater of the latter becomes larger than that of the former. As a result, the obtained temperature rise is smaller than that obtained when the electrode surfaces are formed on the upstream and downstream end surfaces of the ceramic heater.

Therefore, in order to raise the temperature of the ceramic heater rapidly, electrodes are required to be formed on each of the walls defining the open passages in addition to the upstream and downstream end surfaces or the side surface of the ceramic heater. However, in this case, the structure of the electrodes becomes complex so that the operation for forming such electrodes becomes troublesome. Furthermore, in this case, the shape of each of the open passages is limited to only a rectangular shape.

Accordingly, one object of the present invention is to provide a fuel evaporator provided with a PTC ceramic heater which is disposed in an air-fuel passage of an engine, by which fuel in an air-fuel mixture is heated so as to promote the evaporation of fuel and improve cold startability of the engine.

Another object of the present invention is to provide a fule evaporator provided with a PTC ceramic heater having a simply structured electrode means, of which the temperature rises rapidly and of which the strength is high.

Atill another object of the present invention is to provide a fuel evaporator provided with a PTC ceramic heater having excellent fuel heating efficiency, of which the heating surface for heating an air-fuel mixture is large.

SUMMARY OF THE INVENTION

The fuel evaporator of the present invention comprises a plurality of layered thin PTC ceramic plates, each of which has a plurality of open holes, electrodes which are provided on an upper surface, an under surface and between adjacent ceramic plates, and an insulator for securing the outer periphery of the layered PTC ceramic plates to the wall defining an air-fuel passage of an engine.

Every other electrodes are connected in series to compose two groups of electrodes.

A first goup of electrodes are connected to one pole of an electric source while a second group of electrodes are connected to the other pole of the electric source. As a result, the ceramic plates are electrically connected to one another in parallel so that each ceramic plate is rapidly heated by consuming only a small amount of electric power.

Additionally, by piling the ceramic plates so that the open holes thereof are communicated with one another while being deviated from one another at a predetermined distance, stepped portions are formed in a plurality of open passages defined by the open holes of the ceramic plates, so that the heating area of the ceramic heater for heating fuel which flows in the above open passages, can be made large. In addition, since the air-fuel mixture flow is disordered at the time of passing the open passages of the ceramic heater, the fuel heating effect is further promoted.

DETAILED DESCRIPTION OF THE EMBODIMENTS

The present invention will be explained in detail in accordance with the embodiments thereof with reference to the accompanying drawings.

FIGS. 1 to 4 illustrate a first embodiment of the fuel evaporator according to the present invention.

Figure 1:
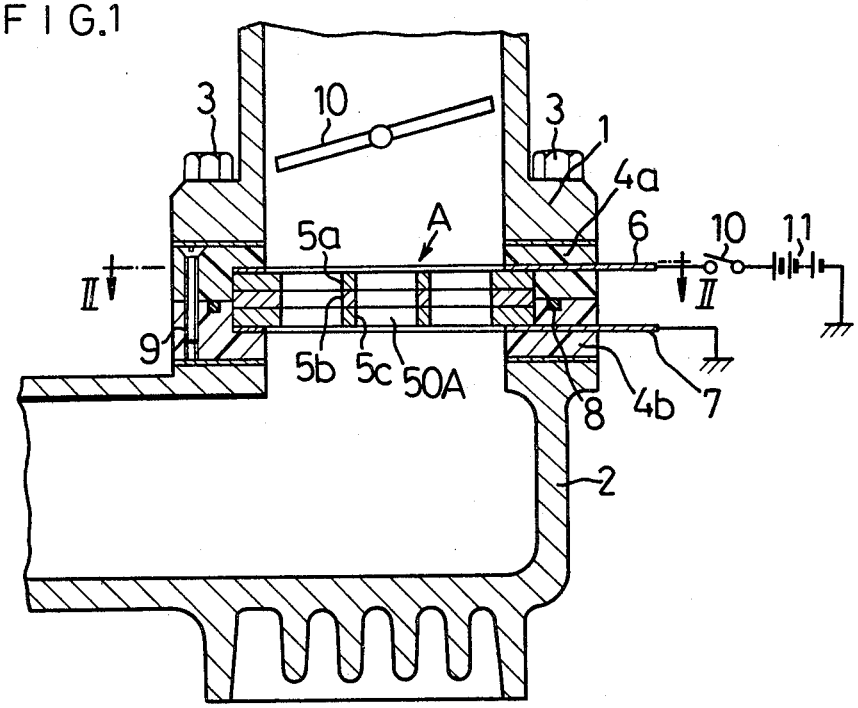
FIG. 1 is a longitudinal sectional view of a first embodiment of the fuel evaporator according to the present invention.

As shown in FIG. 1, a carburetter 1 provided with a throttle valve 10, and an intake manifold 2 are joined to each other through an upper insulator 4a and a lower insulator 4b by means of bolts 3. A PTC ceramic heater A is provided between the carburetter 1 and the intake manifold 2 so as to cross an air-fuel mixture passage of an engine. The outer peripheral portion of the PTC ceramic heater A is disposed within an annular groove formed in the opposed surfaces of the upper insulator 4a and the lower insulater 4b.

The ceramic heater A is composed of three thin PTC ceramic plates 5a, 5b, 5c which are stacked in layers, a positive electrode plate 6 which is provided in contact with the upper surface of the ceramic plate 5a and a negative electrode plate 7 which is provided in contact with the under surface of the ceramic plate 5C.

The upper insulator 4a and the lower insulator 4b are made of thermally and electrically insulating material such as phenol resin. To the upper insulator 4a and the lower insulator 4b, the positive electrode plate 6 and the negative electrode plate 7 are molded, respectively. The insulators 4a, 4b are joined to each other by bolts 9 while an 0 ring 8 is interposed therebetween.

The positive electrode plate 6 and the negative electrode plate 7 are made of a copper plate plated with nickel, respectively.

Figure 2:
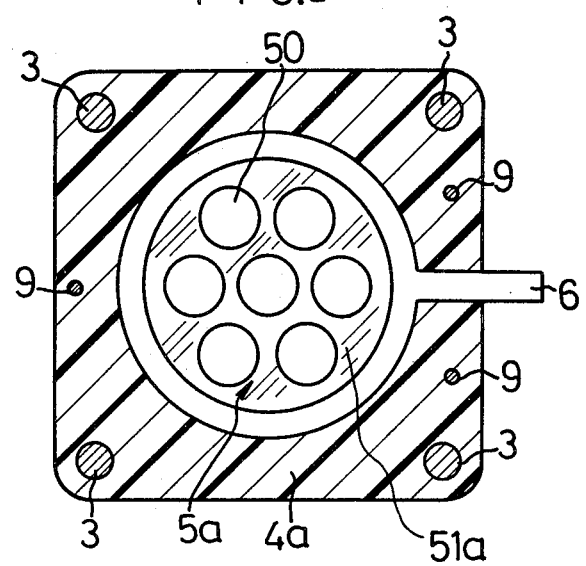
FIG. 2 is a cross sectional view taken along the line II—II of FIG. 1.

As shown in FIG. 2, the positive electrode plate 6 is in contact with the outer peripheral portion of the upper surface of the ceramic plate 5a. The positive electrode plate 6 is connected to a battery 11 through a key switch 10 as shown in FIG. 1.

The negative electrode 7 is in contact with the outer peripheral portion of the under surface of the ceramic plate 5c and is grounded.

Hereinafter, the structure of the ceramic heater A will be explained in detail.

Figure 3:
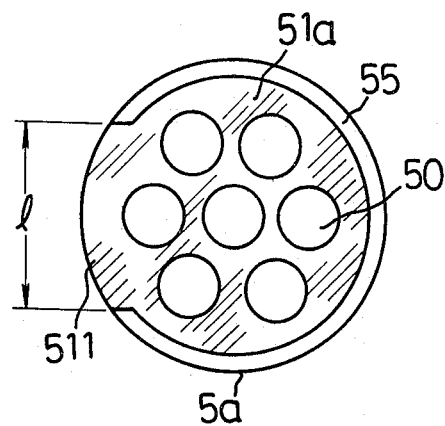
FIG. 3 is a plan view of a ceramic heater.
Figure 4:
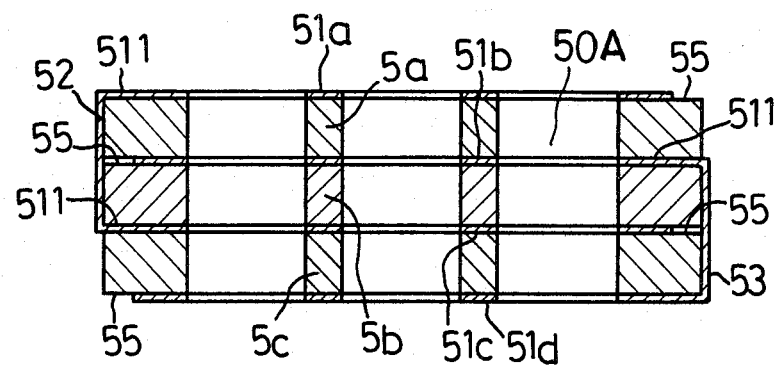
FIG. 4 is an enlarged longitudinal sectional view of a ceramic heater.

Each of the ceramic plates 5a, 5b, 5c is made of PTC ceramic containing barium titanate as a main ingredient. As shown in FIGS. 2 and 3, each ceramic plate is formed into a circular plate of which the diameter is about 40 mm and the thickness is about 2 mm and seven open holes 50 are formed in the center of the circular plate and in the outer peripheral portion thereof at equal distances.

On the upper surface of each of the ceramic plates 5a, 5b, 5c except a horseshoe-shaped portion 55 which extends along the outer periphery thereof, each of the electrode surfaces 51a, 51b, 51c is formed. One portion of each of the electrode surfaces 51a, 51b, 51c extends to the edge of each of the ceramic plates 5a, 5b, 5c to form a conducting portion 511 having a width of 1.

On the under surface of the ceramic plate 5c, an electrode surface 51d is formed. The electrode surface 51d has the same shape as that of the electrode surface 51c and the conducting portion 511 of the electrode surface 51d is formed so as to be radially opposed to that of the electrode surface 51c.

The ceramic plates 5a, 5b, 5c are stacked so that the conducting portion 511 of each of the electrode surfaces 51a, 51b, 51c, 51d are radially opposed to that of the adjacent electrode surface and so that the open holes of the ceramic plates 5a, 5b, 5c are communicated with one another.

On the side surface of the ceramic plates 5a, 5b, an electrode surface 52 having a width of 1, is formed for electrically connecting the conducting portion 511 of the electrode surface 51a to that of the electrode surface 51c. On the side surface of the ceramic plates 5b, 5c, an electrode surface 53 having a width of 1, is formed for electrically connecting the conducting portion 511 of the electrode surface 51b to that of the electrode surface 51d.

The electrode surface 52 is not connected to the electrode surface 51b while the electrode surface 53 is not connected to the electrode surface 51c.

Each of the electrode surfaces 51a, 51b, 51c, 51d, 52, 53 is formed by applying the paste composed of a mixture of a high melting temperature metal such as platinum or molybdenum and a solvent, to each of the ceramic plates 5a, 5b, 5c.

The ceramic heater A is formed by integrally sintering the stacked ceramic plates 5a, 5b, 5c together with the electrode surfaces 51a, 51b, 51c, 51d, 52, 53.

The ceramic heater A which is formed as above described, is provided in an air-fuel mixture passage of an engine as shown in FIG. 1.

The first group of electrodes composed of the electrode surfaces 51a, 51c are connected to the positive pole of the battery 11 through the positive electrode plate 6, and a key switch 10 while the second group of electrodes composed of the electrode surfaces 51b, 51d are grounded through the negative electrode plate 7. As a result, the ceramic plates 5a, 5b, 5c are connected to one another in parallel.

Hereinafter, the operation of the fuel evaporator having the above described structure will be explained.

When the key switch 10 is switched ON, electric current flows from the electrode surface 51a toward the electrode surface 51b by way of the ceramic plate 5a, from the electrode surface 51c toward the electrode surface 51b by way of the ceramic plate 5b, and from the electrode surface 51c toward the electrode surface 51d by way of the ceramic plate 5c. As a result, the ceramic plates 5a, 5b, 5c generate heat.

Each of the ceramic plates 5a, 5b, 5c is low in temperature and thin in thickness so that the electric resistivity thereof is very low. Therefore, a large amount of electric current flows through the ceramic plates 5a, 5b 5c so that the temperature thereof rises up to about 150° C. in a moment thereafter this temperature is maintained.

The air-fuel mixture is heated while passing the open passages of the heater A so that fuel in the air-fuel mixture is sufficiently evaporated and then is supplied to the engine.

Therefore, cold startability of the engine is improved.

Additionally, since the ceramic heater A is formed by stacking a plurality of ceramic plates and sintering the stacked ceramic plates, sufficiently high strength can be obtained.

Figure 5:
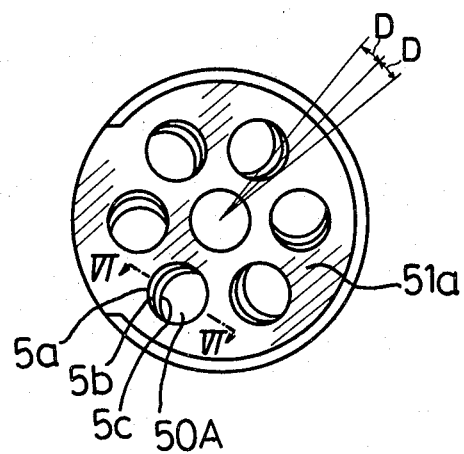
FIG. 5 is a plan view of a ceramic heater employed in a first embodiment.
Figure 6:
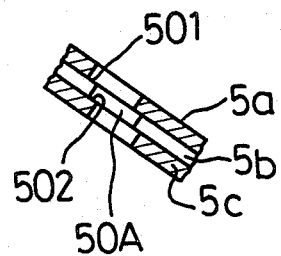
FIG. 6 is a longitudinal sectional view taken along the line VI—VI of FIG. 5.

FIGS. 5, 6 illustrate a second embodiment of the fuel evaporator according to the present invention.

The ceramic plates 5a, 5b, 5c are stacked so that each of the open holes positioned in the outer peripheral portion thereof is deviated from the opposed open hole of the adjacent ceramic plate by a predetermined angle D. As a result, in each of the open passage 50A of the heater A, crescent-shaped stepped portions 501, 502 are formed. The other structure of the second embodiment is substantially equal to that of the first embodiment.

According to the second embodiment, the fuel heating area of the heater A for heating the fuel in the air-fuel mixture passing through the open passages 50A can be enlarged.

Furthermore, due to the impact of fuel against the stepped portions 501, 502, the flow of air-fuel mixture is disordered so that the evaporation of fuel is further promoted.

Figure 7:
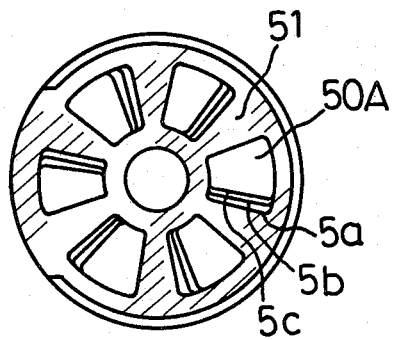
FIG. 7 is a plan view of a ceramic heater employed in a modified embodiment.

The cross sectional shape of the open hole 50 is not limited to a circular shape. Other shape such as a fan-shape will do as shown in FIG. 7.

The number of the ceramic plates to be stacked to not limited to three. According to the present invention, a plurality of, especially an odd number of ceramic plates will do.

As described above, according to the present invention, a plurality of thin PTC ceramic plates are stacked and they are electrically connected in parallel so that the temperature of each of the ceramic plates rises up to about 150° C. in a moment upon receiving electricity.

As a result, the evaporation of fuel is promoted so that cold startability of an engine can be improved.

Furthermore, since a plurality of ceramic plates are integrally joined to one another, the strength of the obtained heater can be made high.

What is claimed is:

1. A fuel evaporator for heating fuel in an air-fuel mixture to be supplied to an engine so as to promote the evaporation of fuel, comprising:
   a heater means which is disposed in an air-fuel mixture passage of said engine so as to cross said passage; said heater means being composed of a plurality and an odd number of stacked ceramic plates, each of which has a plurality of open holes directing in the axial direction of said passage and communicating with open holes of adjacent ceramic plates, and electrodes which are provided on the upstream end surface and the downstream end surface of said stacked ceramic plates and between the opposed surfaces of adjacent ceramic plates; every other electrodes being connected to form two groups of electrodes;
   a first group of electrodes being connected to a positive pole of an electric source while a second group of electrodes being connected to a negative pole of said electric source; and
   a supporting member for supporting said heater means; said supporting member being formed of thermally and electrically insulating material into an annular body, of which the outer peripheral portion is fixed to the wall defining said air-fuel passage of said engine, and the inner peripheral portion retains the outer peripheral portion of said heater means.

2. A fuel evaporator according to claim 1, wherein:
   said electrodes are formed by applying a paste composed of a metal and a solvent to at least one surface of each of said ceramic plates;
   said ceramic plates are stacked so that said electrodes are positioned on the upper surface and the under surface of said stacked ceramic plates and between adjacent ceramic plates; and
   said stacked ceramic plates and said electrodes are sintered.

3. A fuel evaporator according to claim 2, wherein:
   on the side surface of said stacked ceramic plates, two sides electrodes extending in the axial direction of said passage are formed by applying a paste composed of a metal and a solvent so as to be radially opposed to each other; and
   said first group of electrodes are connected to one another through said first side electrode while said second group of electrodes are connected to one another through said second side electrode.

4. A fuel evaporator according to claim 2, wherein:
   said open holes of each of said ceramic plates are deviated from those of adjacent ceramic plates to form stepped portions between the opposed open holes of adjacent ceramic plates.

5. A fuel evaporator according to claim 1, wherein:
   said ceramic plates have an equal shape and size to one another and have an outer shape equal to the cross sectional shape of said air-fuel mixture passage of said engine.

6. A fuel evaporator according to claim 1, wherein:
   said open holes have a circular shape, respectively.

7. A fuel evaporator according to claim 1, wherein:
   said open holes have a fan shape, respectively.

* * * * *